Figure 1:
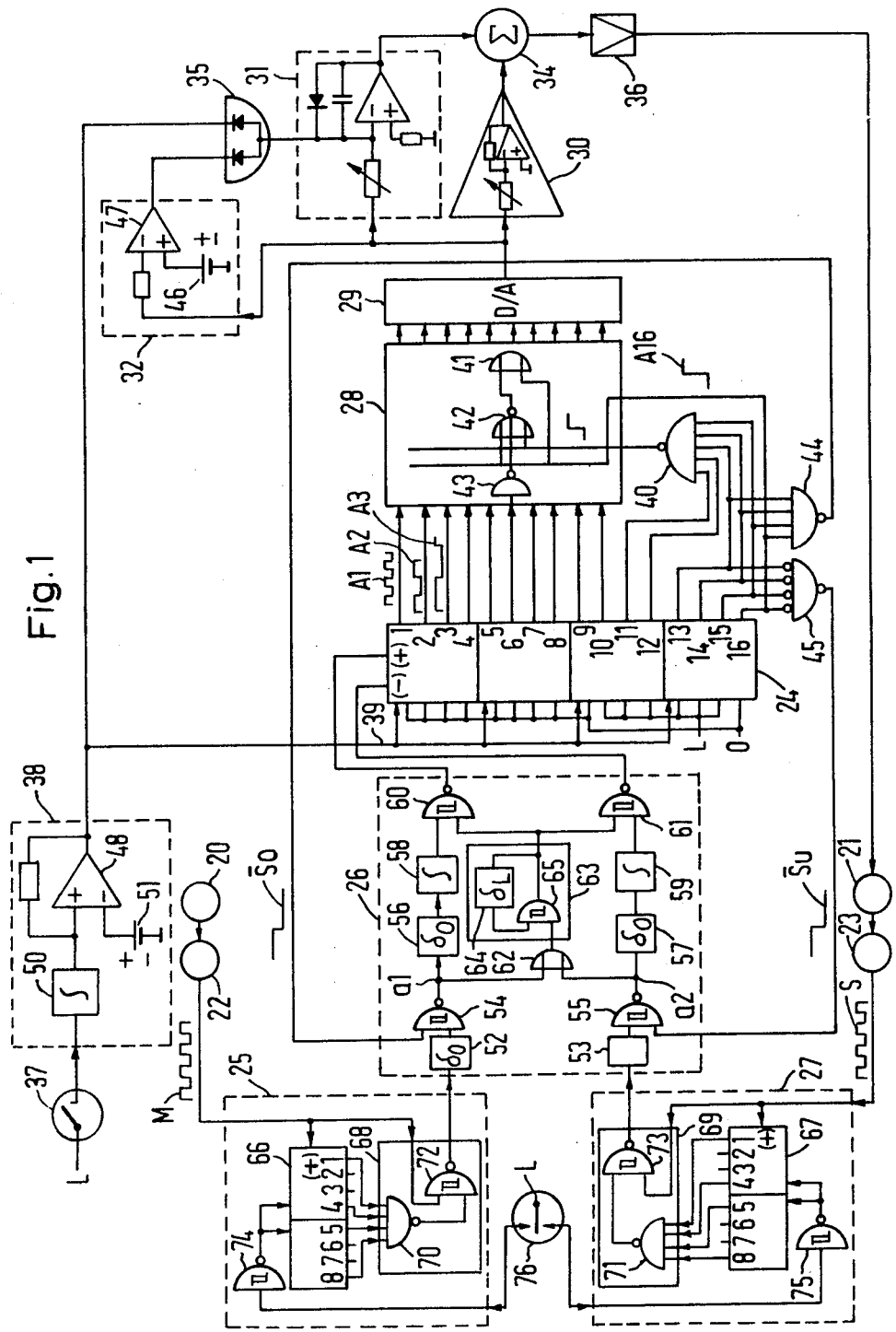

United States Patent [19]

Harvest et al.

[11] 4,196,376
[45] Apr. 1, 1980

[54] ROTARY SPEED RATIO CONTROL ARRANGEMENT

[75] Inventors: Nils-Ole Harvest, Nordborg; Niels Hasberg, Sonderborg; Kaj Nielsen, Nordborg, all of Fed. Rep. of Germany

[73] Assignee: Danfoss A/S, Nordborg, Denmark

[21] Appl. No.: 904,494

[22] Filed: May 10, 1978

[30] Foreign Application Priority Data

May 13, 1977 [DE] Fed. Rep. of Germany ....... 2721634

[51] Int. Cl.[2] ............................................. H02P 5/50
[52] U.S. Cl. .................................................... 318/78
[58] Field of Search ..................................... 318/66–70, 318/77, 78

[56] References Cited

U.S. PATENT DOCUMENTS

| 3,718,846 | 2/1973 | Bejach | 318/78 X |
| 4,052,646 | 10/1977 | Massey et al. | 318/78 X |

Primary Examiner—Gene Z. Rubinson
Assistant Examiner—W. E. Duncanson, Jr.
Attorney, Agent, or Firm—Wayne B. Easton

[57] ABSTRACT

The invention relates to a control circuit for controlling the speed ratio of a lead motor and a follower motor. The outputs of pulse generators driven by the motors are compared by being fed the positive and negative inputs of a bidirectional counter which outputs a positive or negative value indicative of the sensed speed ratio. A digital/analog converter driven by the counter effectively controls the speed of the follower motor pursuant to the sensed speed ratio.

13 Claims, 17 Drawing Figures

| | 16 | 15 | 14 | 13 | 12 | 11 | 10 | 9 | 8 | 7 | 6 | 5 | 4 | 3 | 2 | 1. | |
|---|---|---|---|---|---|---|---|---|---|---|---|---|---|---|---|---|---|
| SBu | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | L | 1 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | 0 | 0 | 0 | 0 | L | L | L | L | L | L | L | L | L | L | L | L | 4095 |
| Zu | 0 | 0 | 0 | L | 0 | 0 | 0 | 0 | 0 | 0 | 0 | 0 | 0 | 0 | 0 | 0 | 4096 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | 0 | L | L | L | L | 0 | L | L | L | L | L | L | L | L | L | L | 31743 |
| P | 0 | L | L | L | L | 0 | 0 | 0 | 0 | 0 | 0 | 0 | 0 | 0 | 0 | 0 | 31744 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | 0 | L | L | L | L | L | 0 | 0 | 0 | 0 | 0 | 0 | 0 | 0 | 0 | 0 | 32256 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | 0 | L | L | L | L | L | L | L | L | L | L | L | L | L | L | L | 32767 |
| Zo | L | 0 | 0 | 0 | 0 | 0 | 0 | 0 | 0 | 0 | 0 | 0 | 0 | 0 | 0 | 0 | 32768 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | L | L | L | 0 | L | L | L | L | L | L | L | L | L | L | L | L | 61439 |
| SBo | L | L | L | L | 0 | 0 | 0 | 0 | 0 | 0 | 0 | 0 | 0 | 0 | 0 | 0 | 61440 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | L | L | L | L | L | L | L | L | L | L | L | L | L | L | L | 0 | 65534 |
| | L | L | L | L | L | L | L | L | L | L | L | L | L | L | L | L | 65535 |

(P block span: 32256 − 31744 + ... = 1024)

Fig.2

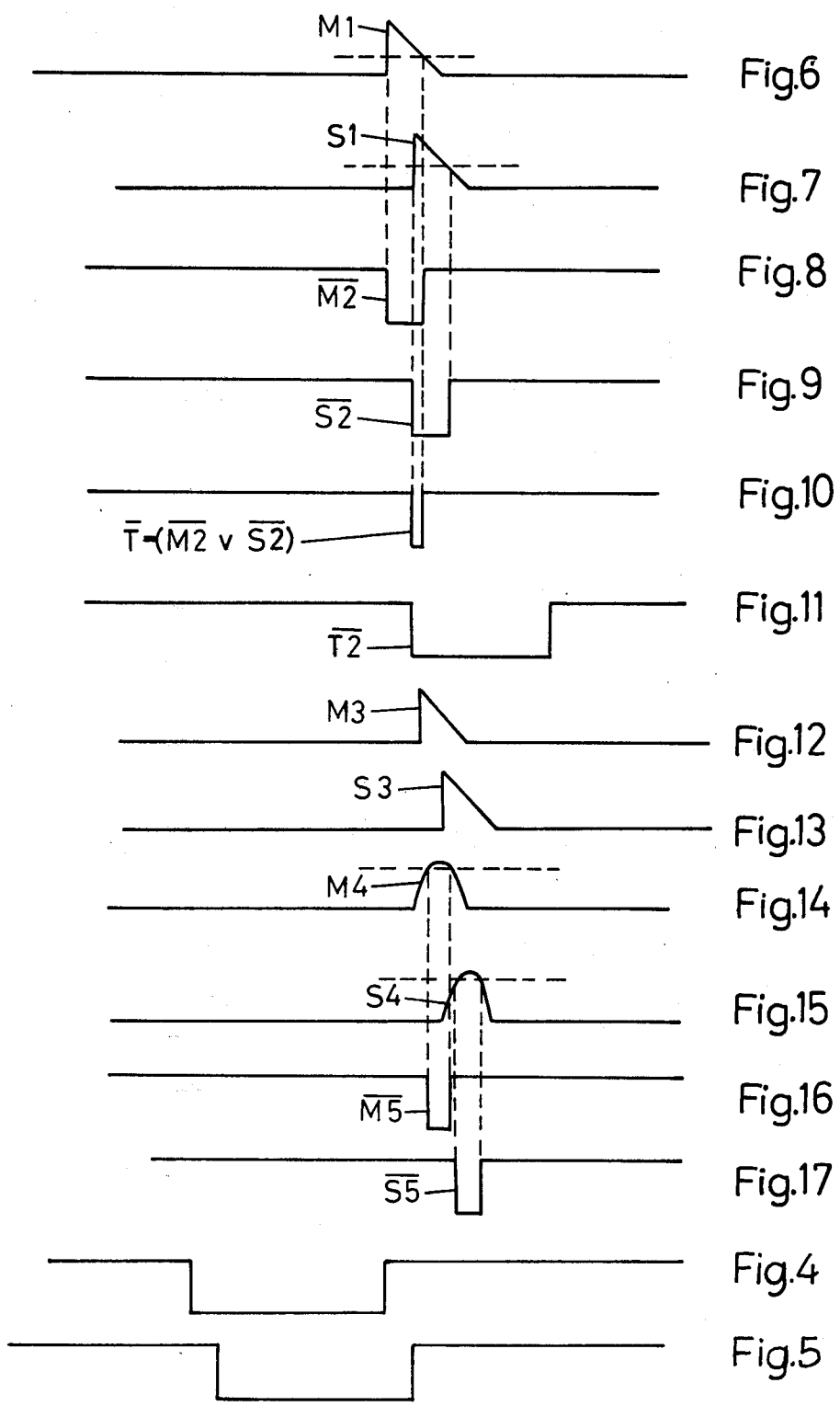

ROTARY SPEED RATIO CONTROL ARRANGEMENT

The invention relates to an arrangement for controlling the rotary speed ratio, particularly synchronisation control, of two motors of which one is adjusted in response to the other, comprising a guide pulse generator transforming the speed of the lead motor to a guide pulse of proportional frequency, and a follower pulse generator transforming the speed of the follower motor to a follower pulse of proportional frequency, a counter counting the difference in the number of pulses produced by the pulse generators, a digital/analogue converter which is downstream of the counter and of which the control range extending from a negative to a positive output value is associated with a mean counting range which is less than the maximum counting range of the counter, the counter being resettable to the midpoint of the mean counting range as zero point and the supply of further pulses to the counter being blockable on exceeding an upper limiting value lying between the upper terminal values of the mean and maximum counting range and on falling below a lower limiting value lying between the lower terminal values of the mean and maximum counting range, and comprising means controlling the follower motor in response to the output value of the digital/analogue converter in the sense of running in synchronism with the lead motor.

In a known arrangement of this kind, the lead pulse and follower pulse are subtracted from one another in a summating station and the differential pulse thus obtained is counted by a counting element with due regard to its sign. This is expensive because a special summating station is required as well as means for detecting the sign. The said limiting values in the known arrangement correspond to the penultimate counted values of the positive and negative halves of the maximum counting range. This substantially utilises the available maximum counting range. Since the utilized counting range and thus the maximum counting range, the counting capacity, are selected so that the maximum control departure to be expected can be detected, the resolution capacity or amplification of the control arrangement and thus the accuracy of control are low in a case where the capacity of the digital/analogue converter corresponds to the mean counting range. To determine the limiting values, all the outputs of the counter must then be scanned. This is likewise expensive.

The invention is based on the problem of providing a control arrangement of the aforementioned kind which permits a higher accuracy of control with less expense.

According to the invention, this problem is solved in that the output signals of the first n outputs in place value of the counter in the form of a bi-directional binary counter, which output signals are feedable to the digital/analogue converter, are settable by an L signal at the highest counter output in place value, all to one of the two binary values and, on simultaneous occurrence of an O signal, are settable at the highest counter output in place value and at at least one of the last m minus n counter outputs, with the exception of the last, all to the other of the two binary values, where $2^n$ corresponds to the mean counting range and m is the number of counter outputs, that like signals with one of the two binary values at all inputs of the digital/analogue converter are associated with the upper terminal value of its output value and like signals with the other of the two binary values at all inputs of the digital/analogue converter are associated with the lower terminal value of its output value, and that, on simultaneous occurrence of L signals at the last m minus p counter outputs in order of place value, where p is less than $m-1$ but larger than n, the pulse fed to the one counter input of the counter is blockable and, on simultaneous occurrence of O signals at these last m minus p counter outputs, the pulse fed to the other counter input is blockable.

If, for example, one chooses n to be merely equal to ten, then the mean counting range already embraces 1 024 counting values with only ten counter outputs. The expenditure is correspondingly low for the circuit elements required for monitoring the limiting values and for setting the input signals when exceeding or falling below the upper terminal value of the mean counting range. Thus, to set the counter output signals which are fed to the digital/analogue converter, a simple gate circuit will be adequate for each counter output associated with the mean counting range. When $n=10$, only ten gate circuits are therefore required which are associated with a common terminal value switching element which, in conjunction with the output signal of the highest counter output in place value, ensures that the output signals of the counter outputs associated with the mean counting range are so controlled on exceeding or falling below the mean counting range that they maintain the condition reached at these terminal values, i.e. always represent L signals or O signals. For example, with a total of $m=16$ counter outputs and $n=10$, one can thus make do with a limiting value switching element which monitors merely $m-n-1=5$ counter outputs, whilst for monitoring the upper and lower limiting value with $p=12$ only two limiting value switching elements with only $m-p=4$ inputs are required which are connected to the four highest counter outputs in place value, whereas in the known case limiting value switching elements with 16 inputs would be required. Nevertheless one obtains a very large counting range in which the instantaneous value of the control departure is constantly detected so that the true control departure is not lost even when exceeding or falling below the mean counting range associated with the digital/analogue converter. Indeed, on exceeding or falling below the mean counting range, as long as one does not exceed or fall below the upper or lower limiting value, rectification of the control departure takes place with maximum speed, until the control departure has been brought back to the mean counting range. Consequently, the capacity of the digital/analogue converter need also not correspond to the entire counting range of the counter. The control behaviour is then merely proportional to the mean counting range and rectification will therefore take somewhat longer only in this proportional range. On the other hand, this has the advantage that the danger of hunting is less. In addition, the amplification is very high in the proportional range because the capacity of the digital/analogue converter is very much less than the utilised counting range. Higher amplification ensures more accurate control. Since the high amplification is conclusively achieved in the digital proportion of the control arrangement, this also contributes to a reduction of the temperature drift, in contrast with using a high amplification in the analogue portion.

Preferably, it is ensured that between the digital/analogue converter and the control means there is an amplifier with adjustable amplification and an output value range corresponding to the output value range of the digital/analogue converter. With the aid of this amplifier, the proportional range of the control arrangement can be set to an optimum with due regard to maintaining the control circuit stability; for example, it can be further reduced so that one obtains an overall higher control speed and a lower residual control departure.

To avoid a residual control departure altogether, an integrator may be in parallel with the amplifier. In this way one ensures above all that accurate synchronism of the two motors is achieved, i.e. that there is no error in the rotary angle. It is favourable if a threshold value stage with a threshold value substantially equal to the upper terminal value of the output value of the digital-/analogue converter is disposed between the digital-/analogue converter and a resetting input of the integrator. This threshold value stage sets the integrator back and out of operation as soon as its threshold value has been exceeded so that, even with control departures exceeding the terminal value, compensation is obtained at high speed and the stability of the control circuit is ensured.

Between a starting switch and a resetting input of the counter there may be a delay element which, after actuating the starting switch, belatedly terminates resetting of the counter begun on switching on the operating voltage.

In this case it is a prerequisite that the operating voltage is applied to the rotary speed ratio control arrangement before the motors are switched on. By applying the operating voltage to the control arrangement, the counter, which comprises flip-flop circuits, assumes an arbitrary counting value. However, since an O signal occurs at the output of the delay element on application of the operating voltage, the counter is stopped and set to zero, i.e. to a counting value corresponding to the middle of the P range. After the two motors have been brought to the desired positions relatively to one another, the starting switch is actuated. Upon expiry of the delay period of the delay element, resetting of the counter is terminated. The arrangement is now ready for operation and, when the lead motor is switched on, a signal for switching on the follower motor is delivered as soon as a control departure occurs in the form of a voltage at the output of the digital/analogue converter. Provided that there was no resetting, the follower motor could not start because the counter gave no indication of a control departure.

Further, the output of the delay element may be connected to the resetting input of the integrator. In this way one ensures that the integrator is first reset and stopped when the operating voltage of the arrangement is switched on, before resetting is terminated after expiry of the delay period and operation of the integrator as well as of the counter is released so that, upon commencement of operation, any integration values that may still be present and which would otherwise lead to excessively high control departures are first brought to zero.

To prevent pulses from being fed simultaneously from both pulse generators to the bi-directional counter, which would result in a counting error, one can ensure that the pulses of the pulse generators are feedable to the counter by way of a blocking circuit for coincidence pulses. The counter will then only count the pulses fed to those of its inputs which are relatively offset.

The coincidence pulse blocking circuit may comprise two output gates which are associated with the respective counter inputs, the transmission inputs of which can have a respective one of the pulses fed to it, and the sensing inputs of which are connected by way of a pulse extending element to the output of a coincidence switching element which interlinks the pulses. In this way one ensures that pulses which only overlap one another are also not counted.

The coincidence pulse blocking circuit may comprise two input gates of which the outputs are connected to a respective one of the inputs of the coincidence switching element and the transmission input of one of the output gates and of which the transmission input can be fed with a respective one of the pulses by way of a respective differentiating element and of which the sensing input can be fed with a blocking signal which is produced on exceeding the upper and on falling below the lower limiting value of the counting range. The differentiating elements on the input side will then shorten the pulses fed to the input gates so that the danger of overlap between these pulses is substantially avoided. By reason of shortening the pulses one can further increase the pulse frequency and thus the accuracy of measurement and control. The input gates not only ensure that in the case of exceeding or falling below one of the limiting values of the counting range the pulse is blocked which brought about such exceeding or falling below that there will also be no determination of coincidence and only the other pulse will be fed to the counter.

Further, between the output of the input gate and the transmission input of the output gate of each transmission channel of the coincidence pulse blocking circuit there may be a differentiating element and an integrating element in series. This additional differentiating element and the integrating element effect further shortening of the pulses so that only very slightly overlapping or directly adjoining pulses of the one and the other pulse will be shortened still further so that a spacing is produced therebetween and they can be readily distinguished by the bi-directional counter.

Next, it is favourable if the gates in the coincidence pulse blocking circuit are in the form of threshold value trigger elements. In this way the gates will supply output signals with more readily distinguishable flanks even though the inclination of the flanks is reduced during the differentiation and integration.

A pulse frequency converter is preferably connectible between the guide pulse generator and the one counter input of the counter or between the follower pulse generator and the other counterinput of the counter. This enables a change to be obtained in the speed ratio of the lead and follower motor at little cost. A particularly simple construction is obtained by a pulse frequency converter which suppresses every ith pulse. This can be achieved particularly simply in that the pulse frequency converter comprises a uni-directional counter which, at a predetermined state of the counter, blocks a downstream gate circuit over which the pulse of the live pulse generator can be fed to the bi-directional counter.

Figure 3:
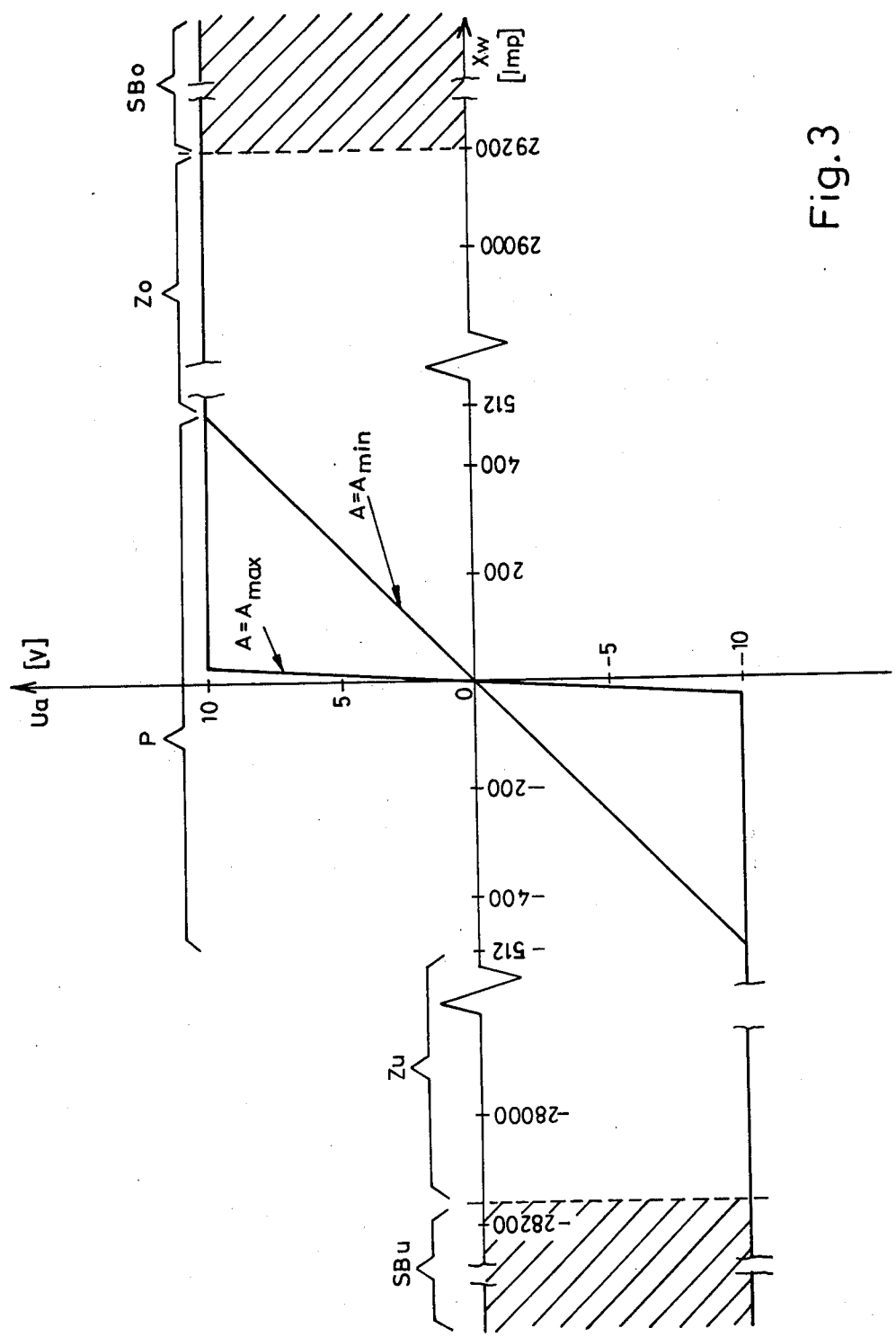

The invention and its developments will now be described in more detail with reference to a preferred example shown in the drawings, wherein:

FIG. 1 is a block diagram of the entire arrangement;
FIG. 2 is a table with predetermined counter states of a bi-directional counter of the arrangement;
FIG. 3 shows the transmission characteristics of a digital/analogue converter which is downstream of the bi-directional counter and has an adjustable amplifier downstream thereof and FIGS. 4 to 17 are pulse diagrams of a coincidence pulse blocking circuit upstream of the bi-directional counter.

According to FIG. 1, the arrangement for controlling the rotary speed ratio, particularly synchronisation control, of two motors 20 and 21, in the present case asynchronous motors, of which the motor 20 serves as the lead motor and the other motor 21 as the following motor, comprises a guide pulse generator 22 and a follower pulse generator 23. The guide pulse generator 22 transforms the rotary speed of the lead motor 20 into a frequency proportional guide pulse M and the follower guide generator 23 converts the speed of the follower motor 21 into a frequency proportional follower pulse S. The lead pulse M is fed to the forward counting input (+) of a bi-directional counter 24 in the form of a binary counter with 16 outputs 1–16 by way of a pulse frequency converter 25 and a transmission channel of a coincidence pulse blocking circuit 26, whilst the follower pulse S is fed to the backward counting input (−) of the counter 24 by way of a second pulse frequency converter 27 and a second transmission channel of the coincidence pulse blocking circuit 26. By way of a gate circuit arrangement 28, the inputs of a digital/analogue converter 29 are connected to the ten outputs 1–10 of the counter 24. At the output of the digital/analogue converter 29 there are an amplifier 30 with adjustable amplification, an integrator 31 and a threshold value stage 32 with inverse behaviour. The outputs of the amplifier 30 and integrator 31 are connected to the inputs of a summating element 34 whilst the output signal of the threshold value stage 34 can be fed to a resetting input of the integrator 31 by way of an AND element 35. The summating element 34 is followed by a control device 36 having a frequency-controllable invertor as the setting element for the follower motor 21. On actuation of a starting switch 37, a delay element 38 connected directly to a resetting input 39 of the counter 24 and by way of the AND element 35 also connected to the resetting input of the integrator 31 is supplied with an L signal which belatedly terminates resetting that occurred on switching on the operating voltage of the control arrangement by the O signal from the output of the delay element 38, thereby to ensure that the operating voltage is fully built up on all components of the arrangement before counting starts at the zero point determined by the resetting whereby the follower motor 21 starts to turn.

To explain the operation of the counter 24 and the downstream equipment, reference will now be made primarily to FIGS. 2 and 3 in addition to FIG. 1.

FIG. 2 represents in the form of a table the conditions of the output signals A1–A16 that could occur at the outputs 1 to 16 of the counter 24. A few of these output signal conditions are shown at the right-hand side of the table in decimal figures associated with the binary-decimal code.

FIG. 3 shows the course of the output voltage Ua of the adjustable amplifier 30 at minimum amplification $A = A_{min} = 1$ of the amplifier 30, wherein Ua is equal to the output value of the digital/analogue converter 29, and at maximum amplification $A = A_{max}$ of the amplifier 30 in dependence on the control departure Xw of the rotary angle error measured as an impulse number referred to the mid-point 32 256 of a mean counting range P of the counter 24 as the zero point. Only the characteristic line at $A = A_{min}$ will, however, be first considered in the following description. The counting ranges of the counter 24 mentioned in detail also refer to these characteristic lines.

The mean counting range P of the counter 24 of 31 744 to 32 767 is associated to a proportional range of the control arrangement (hereinafter also referred to as the P range). As soon as the upper terminal value 32 767 of the mean counting range P is exceeded, which is very easily determined by the fact that the output signal A16 changes to L at the highest counter output 16 in place value, all the output signals A1 to A10 of the counter 24 are so controlled in the gate circuit arrangement 28 by this output signal A16 that all inputs of the digital-/analogue converter 29 are fed with an L signal.

The digital/analogue converter 29 then retains the output voltage value of 10 V according to FIG. 3 corresponding to the terminal value 32 767 of the mean counting range P. If, however, one falls below the lower terminal value 31 744 of the mean counting range P, which is determined by the fact that, as long as the output signal A16 is still O, a limiting value switching element 40 in the form of a NAND element with four inputs merely interlinks the outputs 11 to 15 of the counter 24, all the output signals A1 to A10 of the counter 24 are so controlled by the gate circuit arrangement 28 that all inputs of the digital/analogue converter 29 are fed with an O signal and the latter continues to retain the output voltage value of −10 V corresponding to the lower terminal value 31 744 of the mean counting range P. At all counter conditions within the mean counting range P, the output signals A1 to A10 are switched directly to the digital/analogue converter 29. For this purpose the gate circuit arrangement 28 contains a simple gate circuit 41 to 43 for each of the outputs 1 to 10 of the counter 24, only one of these gate circuits being shown for simplicity because they can all have the same construction. If the output signal of the limiting value switching element 40 is designated I, the counter output signal associated with the respective gate circuit 41 to 43 of the arrangement 28 is designated Ax, where x is a whole number from 1 to 10, but the output signal of the respective gate circuit 41 to 43 is designated Axa, then this gate circuit 41 to 43 performs the following switching function $$Axa = A16 v I v A16 v \overline{Ax}$$

where the symbol 'v' represents an OR interlinking. This switching function can also be realised in various other ways according to the rules of algebraic switching. An OR element 41 with two inputs is shown, of which one is connected to the output of a NOR element 42 having three inputs and the other is connected to the counter output 16. The NOR element 42 then receives the signals I and A16 directly as well as the output signal Ax, in this case A6, by way of a NOT element 43. Since the interlinking of the signals I and A16 is the same for all gate circuits of the arrangement 28, it can also be separately realised in its own interlinking element.

On switching on the operating voltage of the control arrangement by the O signal from the output of the delay element 38, the counter 24 is reset to the counting value 32 256, i.e. the mid-point of the mean counting range P. For this purpose, inputs associated with the individual stages of the counter 24 and determining their resetting condition are simultaneously occupied by an L signal or an O signal, before the resetting input 39 is fed with an L signal as a releasing signal after switching on the switch 37. Even when the control departure Xw exceeds or falls below the P range so that the output voltage Ua of the digital/analogue converter 29 or of the amplifier 30 remains constant at the respective terminal value of its control range (see FIG. 3), the counter condition continues to increase in an upper intermediate range Zo or continues to decrease in a lower intermediate range Zu, so that the instantaneous value of the control departure Xw continues to be indicated or detected by the counter 24, namely up to an upper limiting value 61 439 lying between the upper terminal value 32 767 of the mean counting range or proportional range P and the upper terminal value 65 536 of the maximum counting range, and up to a lower limiting value 4 096 which lies between the lower terminal value 31 744 of the mean counting range P and the lower terminal value 0 of the maximum counting range. As soon as the counter condition exceeds the upper limiting value 61 439, a further limiting value switching element 44 which merely scans the four highest counter outputs 13 to 16 in place value, in this case in the form of a NAND element with four inputs, produces a blocking signal $$\overline{So} = A13 \& A14 \& A15 \& A16$$

which, in the presence of all output signals A13 to A16 of the counter in the form of L signals blocks the transmission of the guide pulse M by way of the coincidence pulse blocking circuit 26 to the forward counting input (+) of the counter 24. If, however, there is falling below the lower limiting value 4 096, a third limiting value switching element 45, in this case a NAND element with upstream NOT elements or a NOR element with four inputs which likewise only scans the four highest counter outputs 13 to 16 in place value, produces in the presence of all output signals A13 to A16 in the form of O signals a blocking signal $$\overline{Su} = \overline{A13} \& \overline{A14} \& \overline{A15} \& \overline{A16}$$

which blocks the transmission of the follower pulse S to the backwards counting input of the counter 24 by way of the coincidence pulse blocking circuit 26.

In this way one obtains an upper blocking range SBo and a lower blocking range SBu at which, when they are reached, the supply of further pulses to the counter 24 is blocked in the one or other direction to prevent exceeding or falling below the maximum counting range or the counting capacity of the counter 24 when the one motor runs considerably faster than the other or the relative angular position of both motors 20, 21 differs more than is permissible.

Without this interruption in the feeding of pulses there would be the danger that, on exceeding or falling below the maximum counting range, the control departure constantly fluctuates between a maximum positive and a maximum negative value because the counter immediately switches to the counting value 0 in the case of exceeding or to its maximum counting value 65 535 in the case of falling below. The result would be such hunting of the rotary speed and direction of rotation of the follower motor.

During an interruption in the pulse feed to one of the counter inputs, the pulse feed is continued to the other counter input so that the counter condition is very quickly returned to the control range lying between the values 4 095 and 61 440.

The intermediate ranges Zo and Zu have the effect of a safety zone in which the control departure Xw is arbitrarily held constant in the same way as in the blocking ranges SBo and SBu but the counter condition in the intermediate ranges Zo and Zu still corresponds to the actual instantaneous values of the control departure. In comparison with the other ranges, the intermediate ranges Zu and Zo are then very large to enable the largest expected control departure also to be detected.

As long as the control departure Xw exceeds or falls below the P range, the follower motor 21 is driven at maximum or minimum speed so that the control departure is very rapidly compensated again.

By increasing the amplification of the amplifier 30, the control speed can be increased still further because on an increase in the amplification the limiting values of the linear compensating range of the amplifier 30 are already reached at lower control departures as shown by the line $A = A_{max}$, so that the control is effected correspondingly earlier at the maximum speed. In practice, the amplification is set to the highest value at which the control procedure is still adequately stable, i.e. at least permanent fluctuations in the control value are avoided.

An increase in the amplification involves constriction of the proportional range of the closed control circuit but without the operating condition of the counter or of the digital/analogue converter 29 changing. Only the (maximum) capacity of the digital/analogue converter 29 is not fully utilised.

Without the integrator 31, the control arrangement has an I behaviour in relation to the control of the speed because the counter 24 has a measure for the rotary speed control departure forms the integral of the speed departure, i.e. it determines the control departure of the rotary angle. By reason of this I behaviour there is practically no residual angular control departure. In relation to angular control, the control arrangement without the integrator 31 has a P behaviour so that a residual angular control departure could occur. The integrator 31 in parallel with the amplifier 30 therefore superimposes on the control departure occurring at the output of the amplifier 30 an I proportion in dependence on the control departure occurring at the output of the digital/analogue converter 29. In this way one obtains in relation to angular control a control arrangement with PI behaviour at which an angular control departure is also fully avoided.

The threshold value of the threshold value stage 32 and determined by a voltage source 56 with fixed voltage, for example a Zener diode or a voltage divider, at the non-inverting input of a differential amplifier 47 is so chosen that the output voltage of the differential amplifier 47 changes to 0 as soon as the voltage fed to the inverting input of the differential amplifier 47 from the output of the digital/analogue converter 29 exceeds a voltage associated with the upper limiting value 32 767 of the P range or a somewhat lower voltage. The integrator 31 is thereby set back and stopped so that the I proportion is ineffective. At larger control departures beyond the P range the integrator would, if no countermeasures are taken, continue to integrate up to saturation. Only when the control departure is negative again would the output signal of the integrator fall off again. This would delay the control with positive as well as with negative control departures. The integrator therefore also has a limit for negative control departures in the form of the diode which is in parallel with the integration condenser and which prevents the integrator output voltage from becoming less than zero. To prevent the integrator from continuing to integrate on positive control departures beyond the P range, the threshold value stage 32 is so designed that the integrator is reset to zero at control departures larger than 500 pulses. Operation of the integrator 31 is then released again only when falling below the threshold value of the threshold value stage 32.

In the same way the integrator 31 is released by way of the delay element 38 which has a coupled differential amplifier 48 of which the non-reversing input is fed with an L signal by way of an RC integrating element 50 upon actuation of the switch 37, whereas it reversing input has a positive threshold value applied to it which is fed by a voltage source 51, for example a Zener diode. As long as the voltage at the non-reversing input of the differential amplifier 48 is less than the threshold value voltage, an O signal occurs at the output of the differential amplifier 48 to reset and stop the integrator 31. When the output voltage of the RC integrating element 50 exceeds the threshold value voltage, however, an L signal appears at the output of the delay element 38 to release the operation of the integrator 31 if the threshold value stage 32 also delivers an L signal.

To avoid erroneous counting, the coincidence pulse blocking circuit 26 blocks the supply of guide and follower pulses to the counter 24 which are simultaneously or overlappingly fed to its transmission inputs. For this purpose the coincidence pulse blocking circuit 26 contains at the input side a respective differentiating element 52, 53, a respective input gate 54, 55 downstream thereof, further downstream in series a respective differentiating element 56, 57 and an integrating element 58, 59 in front of the transmission input of each output gate 60, 61 of which the outputs are in each case connected to the forwards or backwards counting input of the counter 24. The elements 52, 54, 56, 58 and 60 consequently form the one transmission channel and the elements 53, 55, 57, 59 and 61 form the other transmission channel of the coincidence pulse blocking circuit 26. The outputs of the input gates 54, 55 are interlinked by way of branch positions a1, a2 by a coincidence switching element 62 in the form of an OR element of which the output is connected by way of an impulse extending element 63 in the form of a monostable trigger element to the sensing inputs of the output gates 60, 61. The impulse extending element 63 contains a gate 65 which is coupled back by way of a differentiating element 64 and the transmission input of which is connected to the output of the coincidence switching element 62.

The gates 54, 55, 60, 61 and 65 are threshold value trigger elements of which the output signal changes to the one condition when both their input signals exceed a threshold value and of which the output signal is changed to the other condition when at least the one input signal falls below the threshold value again. Functionally, the gates 54, 55, 60, 61 are NAND elements and the gate 65 is an AND element but the latter can likewise be formed of two trigger NAND elements in series of which the second is switched as a NOT element.

The differentiating elements 52, 53, 56, 57 and 64 are simple RC elements, the condenser of elements 52, 53, 56 and 57 being applied to O potential by way of a resistor and the condenser of the element 64 being applied to L potential. The integrating elements 58 and 59 are likewise simple RC elements.

The sensing inputs of the input gates 54 and 55 are respectively connected to the outputs of the limiting value switching elements 44 and 45. The operation of the coincidence pulse blocking circuit 26 will hereinafter be described in more detail with reference to FIGS. 4 to 17.

The differentiating element 52 is fed with the pulse $\overline{M}$ shown in FIG. 4 from the guide pulse generator 22 and the differentiating element 53 is fed with the pulse $\overline{S}$ shown in FIG. 5 from the follower pulse generator 23. The pulses $\overline{M}$ and $\overline{S}$ may overlap in time as shown.

At the output of the differentiating element 52 there will then occur the differentiated pulse M1 according to FIG. 6 and at the output of the differentiating element 53 there will occur the differentiated pulse S1 according to FIG. 7, the shapes of the pulses being diagrammatically indicated as triangles and the negative impulses which occur during differentiation and which are blocked anyway being omitted to simplify the drawing. The differentiated pulses M1 and S1 are considerably shortened relatively to the input pulses $\overline{M}$ and $\overline{S}$ but overlap to a much smaller extent. As soon as the differentiated pulses M1 and S1 exceed the threshold values of the input gates 54, 55 shown in FIGS. 6 and 7 as horizontal broken lines, they will, if they are scanned by the L signal So or Su, deliver the pulses $\overline{M2}$ and $\overline{S2}$ shown in FIGS. 8 and 9, which immediately disappear again as soon as the differentiated pulses M1 and S2 again fall below the threshold value of the input gates 54 or 55. At the output of the OR element 62 there will then occur the pulse $$\overline{T} = \overline{M2}\nu\overline{S2}$$

shown in FIG. 10 as long as the pulses $\overline{M2}$ and $\overline{S2}$ overlap. This pulse $\overline{T}$ actuates the pulse extending element 63 which thereupon delivers a pulse $\overline{T2}$ which is considerably extended relatively to the short input pulse and which blocks the output gates 60 and 61.

The pulses $\overline{M2}$ and $\overline{S2}$ are again differentiated in the differentiating element 56 or 57 so that one obtains the pulses M3 and S3 which are again diagrammatically illustrated as triangles in FIGS. 12 and 13, the negative pulses occurring during differentiation again being omitted. The integration of these pulses M3 and S3 in the integrating elements 58 and 59 results in the pulses M4 and S4 shown in FIGS. 14 and 15. However, since the output gates 60 and 61 are blocked, these pulses are suppressed without changing the state of the counter. If, however, the pulses $\overline{M2}$ and $\overline{S2}$ shown in FIGS. 8 and 9 no longer overlap because of the first differentiation, since the overlap of the input pulses M and S is less than shown in FIGS. 4 and 5, the impulse extending element 63 is not actuated and the output gates 60 and 61 are scanned by the L signal occurring at the output of the element 63 in the rest condition. If the pulses M4 and S4 then exceed the threshold values of the output gates 60 and 61 shown by horizontal broken lines in FIGS. 14 and 15, they produce the pulses $\overline{M5}$ and $\overline{S5}$ shown in FIGS. 16 and 17, which last only as long as the threshold values of the output gates 60 and 61 are exceeded by the pulses M4 and S4. The pulses $\overline{M5}$ and $\overline{S5}$ are therefore not only shorter than the pulses $\overline{M2}$ and $\overline{S2}$ but they also no longer overlap, so that they can be distinguished by the counter 24. The additional pulling apart of the pulses by the second differentiation in conjunction with the subsequent integration and the threshold value sensitivity of the output gates therefore ensure that also those pulses $\overline{M2}$ and $\overline{S2}$ are counted which directly adjoin one another or overlap one another to such a small extent that the pulse extending element 63 is not actuated and the output gates remain scanned. To change the speed ratio of the motors 20 and 21, the pulse frequency converters 25 and 27 are provided. They each contain a unidirectional counter 66 or 67 which is built up from two binary decimal counting stages and have a total counting capacity of 100 and a gate circuit 68 or 69 downstream of the counter 66 or 67 with a NAND element 70 or 71 with four inputs and a NAND element 72 or 73 with threshold value trigger behaviour. The outputs 1, 4, 5 and 8 of the counters 66, 67 are connected to the respective inputs of the NAND element 70 or 71. The output of the NAND element 70 or 71 is connected to the scanning input of the NAND element 72 or 73. The guide pulse M or the follower pulse S is fed to the transmitting input of the NAND element 72 or 73 and the counting input (+) of the counter 66 or 67. The output of the NAND element 72 or 73 is connected to the differentiating element 52 or 53 of the coincidence pulse blocking circuit 26. By way of a bi-stable inverting stage 74 or 75 with threshold value trigger behaviour, the resetting and blocking inputs of the counters 66, 67 are fed in the illustrated mean normal position of a three-position reversing switch 76 with an L signal which resets both counters 66, 67 to 0 and blocks the further operation of the counters 66, 67. O signals will then occur at all outputs 1 to 8 of the counters 66, 67 and the NAND elements 72, 73 are scanned by the L signals of the NAND element 70, 71. The pulses M and S are therefore allowed to pass unchanged by the NAND elements 72, 73 (except for one reversal). However, if the switch 76 is brought to, say, the upper position, an O signal is fed to the resetting and blocking input of the counter 66. This signal releases the counting operation of the counter 66 whilst the counting operation of the counter 67 remains blocked. With the 99th pulse of the guide pulse M, L signals will occur at all outputs 1, 4, 5, 8 of the counter, so that the NAND element 72 is blocked and suppresses the 99th pulse of the guide pulse M. The 100th pulse of the guide pulse M resets the counter 66 to zero. The 100th pulse and all further pulses except the pulses Nos. 199, 299, 399 etc. are therefore again allowed to pass to the coincidence pulse blocking circuit 26 and thus to the counter 24. This means that, after the first cycle of the counter 66, every 100th pulse is blocked. Consequently the pulse frequency of the pulse actually fed to the counter 24 at the forwards counting input is 1% less than the pulse frequency of the guide pulse M.

Similarly, the frequency of the pulse fed to the backwards counting input of the counter 24 can be reduced by 1% by moving the switch 76 to the lower position. The ratio of the speeds of the two motors will change accordingly. By differently designing the counters 66,67 and/or the gate circuits 68, 69 it is also possible to suppress any desired other pulse, for example very second and/or successive pulses and thereby obtain any desired speed ratio.

It is also possible to employ only one pulse frequency converter which can be selectively switched into the one or the other pulse transmission channel. The pulse frequency conversion can take place automatically or manually.

We claim:

1. A circuit assembly for controlling the rotary speed ratio of two lead and follower motors, comprising, lead and follower pulse generator means for generating lead and follower pulse trains with frequencies proportional to the respective speeds of said motors, bi-directional counter means for counting and outputting the difference in the number of pulses output by said pulse generator means, said counter means having a mean counting range less than the maximum counting range thereof generated by n outputs, said maximum counting range being generated by m outputs, digital/analog converter means responsive to said mean counting range and having an analog output with a negative lower limit and a positive upper limit, means for setting said counter means to an intermediate value as a zero point, control means responsive to said digital/analog converter means for controlling said follower motor, first logic means responsive to outputs of said counter corresponding to the highest and lowest values outputs of said mean counting range for setting said converter respectively to its maximum positive value or its minimum negative value, blocking means for separately blocking the transmission of said lead and follower pulse trains, and second logic means responsive to the highest and lowest place value outputs of an intermediate counting range which bridges said mean counting range for selectively operating said blocking means to avoid counting beyond the upper and lower limits of said counter means.

2. A circuit assembly according to claim 1 including an amplifier 30 with adjustable amplification and an output value range corresponding to the output value range of said digital/analog converter between said converter and said control means.

3. A circuit assembly according to claim 2 including an integrator in parallel with said amplifier.

4. A circuit assembly according to claim 3 including a threshold value state having a threshold value substantially equal to said converter positive upper limit, said threshold value stage being disposed between said converter and a resetting input of said integrator.

5. A circuit assembly according to claim 1 including a starting switch, a delay element between said starting switch and a resetting input of said counter for belatedly terminating the resetting of said counter after the operating voltage is switched on by said switch.

6. A circuit assembly according to claim 5 wherein the output of said delay element is connected to the resetting input of said integrator.

7. A circuit assembly according to claim 1 including a blocking circuit for coincidence pulses, said pulse trains being feedable to said counter by way of said blocking circuit for coincidence pulses.

8. A circuit assembly according to claim 7 wherein said coincidence pulse blocking circuit includes two output gates which are associated with the respective inputs of said counter and have transmission inputs for respectively receiving said pulse trains, a pulse extending element, a coincidence switching element interlinking said pulse trains, said two gates having sensing inputs which are connected by way of said pulse extending element to the output of said coincidence switching element.

9. A circuit assembly according to claim 8 wherein said coincidence pulse blocking circuit includes two input gates of which the outputs are connected to the respective inputs of said coincidence switching element and the transmission inputs of said output gates, differentiating elements at the transmission inputs of said input gates for differentiating said pulse trains, said input gates having sensing inputs for blocking signals.

10. A circuit assembly according to claim 9 including integrating elements in series with said differentiating elements.

11. A circuit assembly according to claim 9 wherein said input and output gates are in the form of threshold value trigger elements.

12. A circuit assembly according to claim 1 including pulse frequency converter means respectively between said pulse generator means and the positive and negative counter inputs of said counter.

13. A circuit assembly according to claim 12 wherein said pulse frequency converter means supresses every $i^{th}$ pulse.

* * * * *